US012676533B2

(12) United States Patent
Yamaguchi et al.

(10) Patent No.:  US 12,676,533 B2
(45) Date of Patent:  Jul. 7, 2026

(54) ELECTRIC MOTOR COOLING APPARATUS

(71) Applicant: HONDA MOTOR CO., LTD., Tokyo (JP)

(72) Inventors: Tadashi Yamaguchi, Tokyo (JP); Tatsuya Ohzu, Tokyo (JP); Shoi Yamanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 154 days.

(21) Appl. No.: 18/625,241

(22) Filed: Apr. 3, 2024

(65) Prior Publication Data

US 2024/0364188 A1      Oct. 31, 2024

(30) Foreign Application Priority Data

Apr. 25, 2023    (JP) ................................. 2023-071334

(51) Int. Cl.
H02K 9/193          (2006.01)
B60K 1/00           (2006.01)
(Continued)

(52) U.S. Cl.
CPC .............. H02K 9/193 (2013.01); B60K 1/00 (2013.01); B60K 11/02 (2013.01); H02K 11/25 (2016.01); H02K 11/30 (2016.01)

(58) Field of Classification Search
CPC ........ H02K 9/193; H02K 11/25; H02K 11/30; H02K 9/19; H02K 1/20; B60K 1/00; B60K 11/02
See application file for complete search history.

(56) References Cited

U.S. PATENT DOCUMENTS

| | | | |
|---|---|---|---|
| 10,224,780 B2 * | 3/2019 | Katsuki .................... | H02K 9/00 |
| 2004/0066099 A1 * | 4/2004 | Weeber .................. | H02K 55/04 |
| | | | 310/58 |

(Continued)

FOREIGN PATENT DOCUMENTS

| | | | | |
|---|---|---|---|---|
| EP | 2736151 A2 * | 5/2014 | .............. | H02K 9/19 |
| JP | 2010-028887 | 2/2010 | | |

(Continued)

OTHER PUBLICATIONS

Japanese Office Action for Japanese Patent Application No. 2023-071334 mailed Jan. 14, 2025.

(Continued)

*Primary Examiner* — Charles Reid, Jr.
(74) *Attorney, Agent, or Firm* — Amin, Turocy & Watson, LLP

(57)          ABSTRACT

A stator core of a cooling apparatus includes: a back yoke having a cylindrical shape; a plurality of tooth portions that protrude along a radial direction from the back yoke; a plurality of slots that are formed between the tooth portions adjacent in a circumferential direction; a cooling path which is provided on the back yoke along the circumferential direction so as not to be in communication with the slot and in which a refrigerant flows; and a refrigerant supply port that is formed on the back yoke and supplies the refrigerant to the cooling path, in which the cooling path is configured to be divided into at least two portions in the circumferential direction, and the refrigerant supply port is formed on each cooling path.

3 Claims, 9 Drawing Sheets

(51) Int. Cl.
B60K 11/02 (2006.01)
H02K 11/25 (2016.01)
H02K 11/30 (2016.01)

(56) References Cited

U.S. PATENT DOCUMENTS

| | | | | |
|---|---|---|---|---|
| 2005/0235672 A1* | 10/2005 | Hsu | ................. | H02K 5/203 |
| | | | | 62/505 |
| 2013/0049495 A1* | 2/2013 | Matsuo | ............. | G06F 16/1748 |
| | | | | 310/59 |
| 2013/0342044 A1* | 12/2013 | Vallinayagam | .......... | H02K 9/06 |
| | | | | 310/53 |
| 2016/0099633 A1* | 4/2016 | Yoshinori | ............. | H02K 9/19 |
| | | | | 310/53 |
| 2017/0317556 A1* | 11/2017 | Hasegawa | ............. | H02K 5/10 |
| 2018/0233997 A1* | 8/2018 | Takahashi | ............. | H02K 1/02 |
| 2019/0280549 A1* | 9/2019 | Inoue | ............. | H02K 9/22 |
| 2019/0305639 A1* | 10/2019 | Seki | ............. | H02K 9/00 |
| 2023/0036400 A1* | 2/2023 | Assaad | ............. | H02K 5/12 |
| 2023/0291270 A1* | 9/2023 | Tabuchi | ............. | H02K 7/003 |
| 2024/0380265 A1* | 11/2024 | Prix | ............. | H02K 9/19 |

FOREIGN PATENT DOCUMENTS

| | | | | | | |
|---|---|---|---|---|---|---|
| JP | 2010028887 A | * | 2/2010 | | | |
| JP | 2012-060695 | | 3/2012 | | | |
| JP | 2012-253899 | | 12/2012 | | | |
| JP | 2017-511116 | | 4/2017 | | | |
| JP | 2019-004658 | | 1/2019 | | | |
| JP | 2019-080365 | | 5/2019 | | | |
| JP | 2019080365 A | * | 5/2019 | | | |
| JP | 2019-115206 | | 7/2019 | | | |
| JP | 2020054074 A | * | 4/2020 | | | |
| WO | WO-2014068826 A1 | * | 5/2014 | ............ | H02K 55/04 |
| WO | 2015/148258 | | 10/2015 | | | |

OTHER PUBLICATIONS

Japanese Office Action for Japanese Patent Application No. 2023-071334 mailed Jun. 24, 2025.

* cited by examiner

ELECTRIC MOTOR COOLING APPARATUS

CROSS-REFERENCE TO RELATED APPLICATION

Priority is claimed on Japanese Patent Application No. 2023-071334, filed on Apr. 25, 2023, the contents of which are incorporated herein by reference.

BACKGROUND

Field of the Invention

The present invention relates to an electric motor cooling apparatus.

Background

An electric motor includes a stator on which a coil is wound and a rotor which is provided rotatably with respect to the stator. When performing power distribution to the coil, a predetermined interlinkage magnetic flux is formed on the stator, and the rotor continuously rotates. Since the stator generates heat by a power distribution resistance of the coil, various techniques have been proposed for cooling the stator.

For example, a technique is disclosed including: a housing that is formed in a cylindrical shape and accommodates a stator on an inner circumference; and a cover that covers an outer circumference of the housing and has an inflow port and an outflow port of a refrigerant. A first flow path groove that is in communication with the inflow port and a second flow path groove that is in communication with the outflow port are formed on the housing. Each flow path groove is formed in an annular shape.

In such a configuration, the refrigerant supplied to the inflow port first flows round the outer circumference of the housing by the first flow path groove and then flows into the second flow path groove. Further, the refrigerant flows round the outer circumference of the housing by the second flow path groove and is then discharged from the outflow port. Thereby, the entire outer circumference of the stator is cooled. As the related art, for example, a technique described in Japanese Unexamined Patent Application, First Publication No. 2019-4658 is disclosed.

SUMMARY

However, in the related art described above, the refrigerant on a further downstream side between the inflow port and the outflow port is heated by the stator. Therefore, there is a problem in that the cooling efficiency in the vicinity of the downstream side of the stator is decreased, and continuous driving of the electric motor is limited.

An aspect of the present invention provides an electric motor cooling apparatus that can uniformly cool an entire stator and can contribute to continuous driving.

An electric motor cooling apparatus according to an aspect of the present invention is a cooling apparatus of an electric motor having a stator, wherein the stator includes: a stator core; and a coil wound around the stator core, the stator core includes: a back yoke having a cylindrical shape; a plurality of tooth portions that protrude along a radial direction from the back yoke; a plurality of slots that are formed between the tooth portions adjacent in a circumferential direction; a cooling path which is provided on the back yoke along the circumferential direction so as not to be in communication with the slot and in which a refrigerant flows; and a refrigerant supply port that is formed on the back yoke and supplies the refrigerant to the cooling path, the cooling path is configured to be divided into at least two portions in the circumferential direction, and the refrigerant supply port is formed on each cooling path.

According to such a configuration, the refrigerant can be supplied separately to each cooling path divided in the circumferential direction of the stator core. Therefore, it is possible to uniformly cool the entire stator, and it is possible to contribute to continuous driving of the electric motor.

In the configuration described above, the stator core may have a fastening portion that fixes the stator core to a fixed body, the fastening portion may have a bolt insertion hole through which a bolt for fixation to the fixed body is inserted, and the refrigerant supply port may be in communication with the bolt insertion hole.

According to such a configuration, the refrigerant can be supplied to the cooling path via the refrigerant supply port using the bolt insertion hole. Therefore, a processing cost of the refrigerant supply port can be reduced, and an impact on the back yoke by forming the refrigerant supply port can be minimized.

The configuration described above may include: a pump that supplies the refrigerant to each refrigerant supply port; a flow rate control device that controls a flow rate of the refrigerant supplied to each refrigerant supply port from the pump; a temperature detection portion that detects a temperature of the stator; and a control portion that controls the flow rate control device based on the temperature detected by the temperature detection portion and controls the flow rate of the refrigerant supplied to the refrigerant supply port.

According to such a configuration, the flow rate of the refrigerant of each cooling path can be controlled in accordance with the temperature of the stator. Therefore, it is possible to further uniformly cool the entire stator, and it is possible to reliably contribute to continuous driving of the electric motor.

In the configuration described above, the stator may be fixed to a vehicle body such that a center axis line is along a vehicle width direction, and the electric motor cooling apparatus may include: a pump that supplies the refrigerant to each refrigerant supply port; a flow rate control device that controls a flow rate of the refrigerant supplied to each refrigerant supply port from the pump; an inclination detection portion that detects an inclination of the vehicle body; and a control portion that controls the flow rate control device based on the inclination detected by the inclination detection portion and controls the flow rate of the refrigerant supplied to the refrigerant supply port.

According to such a configuration, the flow rate of the refrigerant of each cooling path can be controlled in accordance with the inclination of the vehicle body. Therefore, even if the attitude of the stator changes, it is possible to uniformly cool the entire stator, and it is possible to contribute to continuous driving of the electric motor.

According to the electric motor cooling apparatus of the aspect of the present invention, it is possible to uniformly cool the entire stator, and it is possible to contribute to continuous driving of the electric motor.

DESCRIPTION OF EMBODIMENTS

Figure 1:
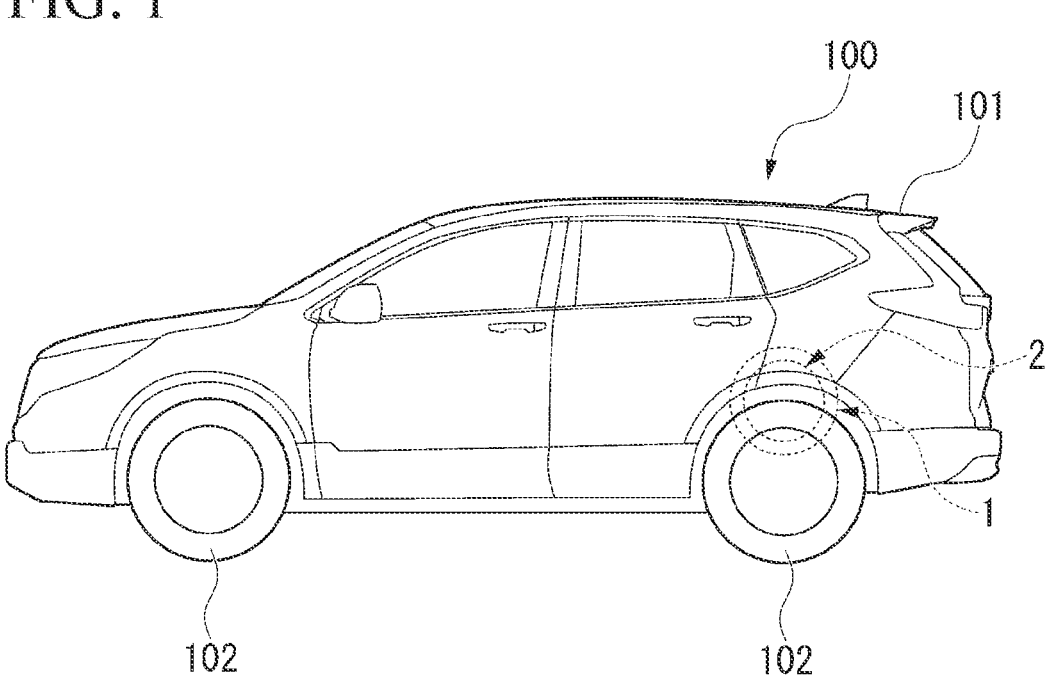
FIG. 1 is a side view of a vehicle when seen from a vehicle width direction in an embodiment of the present invention.
Figure 2:
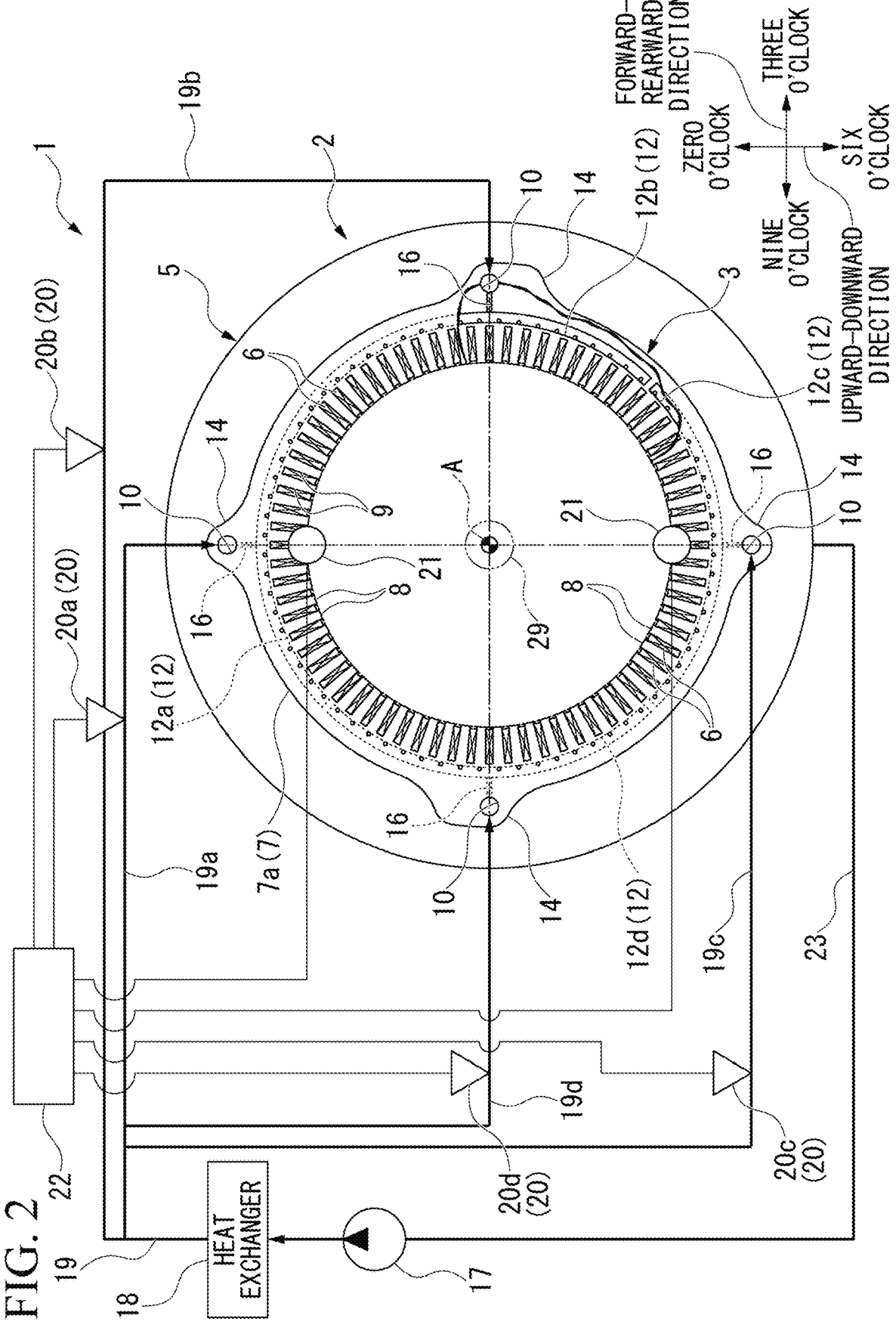
FIG. 2 is a schematic configuration view of a cooling apparatus in the embodiment of the present invention.

Next, an embodiment of the present invention will be described with reference to the drawings.
<Vehicle>
FIG. 1 is a side view of a vehicle 100 on which a cooling apparatus 1 according to an embodiment of the present invention is mounted when seen from a vehicle width direction. FIG. 2 is a schematic configuration view of the cooling apparatus 1.

As shown in FIG. 1 and FIG. 2, the vehicle 100 includes a vehicle body 101 (fixed body) and the cooling apparatus 1 that is mounted on the vehicle body 101 and cools an electric motor 2. In the present embodiment, the cooling apparatus 1 includes the electric motor 2.
<Cooling Apparatus>
<Electric Motor>
The electric motor 2 is a motor that drives and rotates a wheel (for example, a rear wheel) 102 of the vehicle body 101.

The electric motor 2 includes a stator 3 having a cylindrical shape, a case 4 that stores the stator 3, and a rotor (not shown) that is arranged at the middle in a radial direction of the stator 3 and is rotatably supported by the case 4.

By transmitting a rotation force of the rotor to the wheel 102, the wheel 102 is rotated. A rotation axis line of the rotor is along the vehicle width direction of the vehicle body 101. A center axis line A of the stator 3 is matched with the rotation axis line of the rotor. In the following description, when describing the electric motor 2, an axis direction of the stator 3 is simply referred to as an axis direction, a radial direction of the stator 3 is simply referred to as a radial direction, and a circumferential direction (rotation direction of the rotor) of the stator 3 is simply referred to as a circumferential direction.

Figure 3:
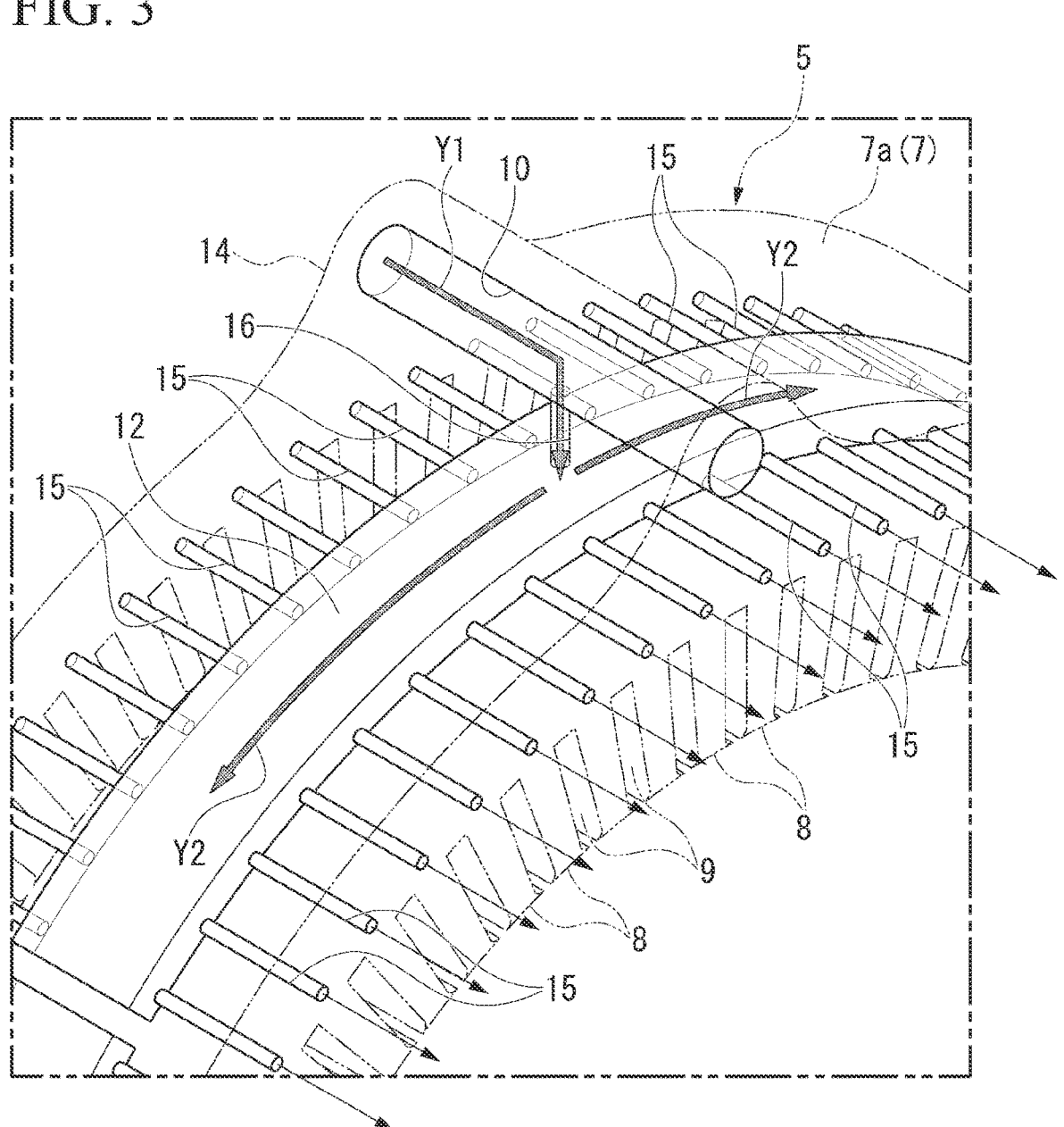
FIG. 3 is an enlarged perspective view of part of a stator in the embodiment of the present invention.
Figure 4:
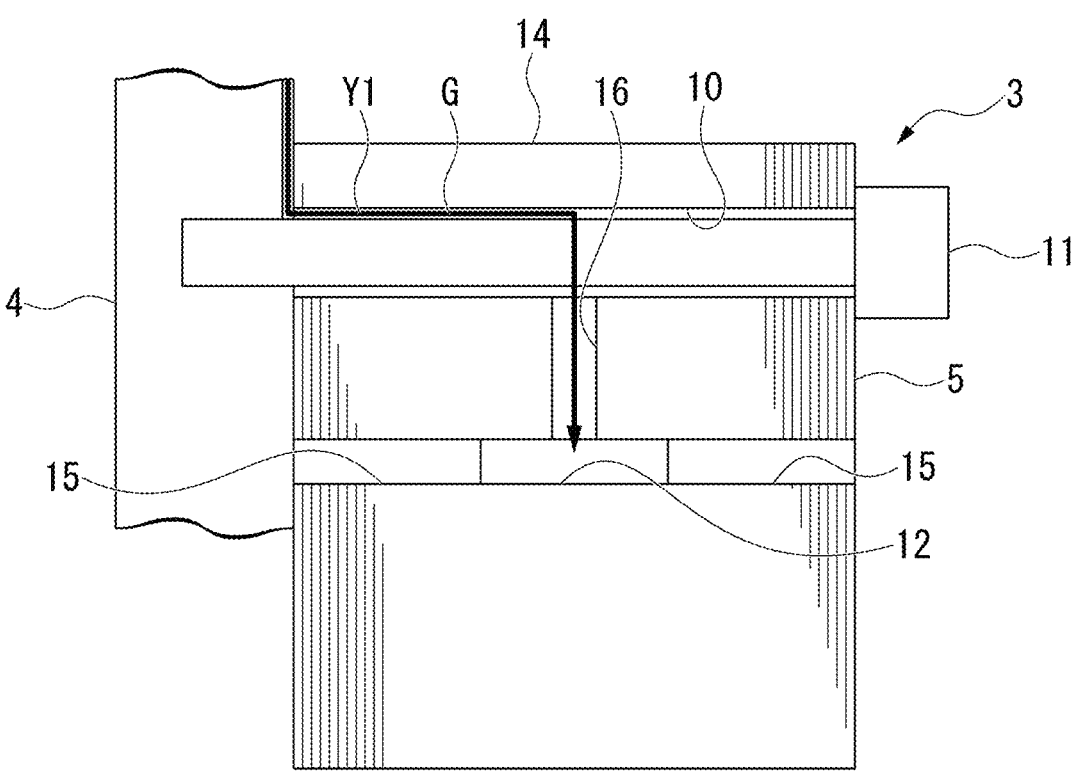
FIG. 4 is a partial cross-sectional view of the stator in the embodiment of the present invention.

FIG. 3 is an enlarged perspective view of part of the stator 3. In FIG. 3, an outer surface of a stator core 5 described later is shown to be transparent for ease of explanation. FIG. 4 is a partial cross-sectional view of the stator 3.

As shown in FIG. 2 to FIG. 4, the stator 3 includes a coil 6 that is wound around the stator core 5 having a cylindrical shape. The stator core 5 is formed by laminating a plurality of electromagnetic steel sheets. The stator core 5 includes a back yoke 7 having a cylindrical shape and a plurality of tooth portions 8 that protrude inward in a radial direction from an inner circumferential surface of the back yoke 7.

The plurality of tooth portions 8 are arranged side by side at equal intervals in a circumferential direction. A slot 9 is formed between two tooth portions 8 adjacent to each other in the circumferential direction. The coil 6 is inserted through the slot 9, and the coil 6 is wound around each tooth portion 8. In FIG. 3 and FIG. 4, the coil 6 is not shown for ease of explanation.

In such a configuration, when performing power distribution to the coil 6, a predetermined interlinkage magnetic flux is formed on each tooth portion 8. The rotor (not shown) is continuously rotated by a magnetic impact of the interlinkage magnetic flux.

Four fastening portions 14 are formed so as to protrude outward in the radial direction on an outer circumferential surface 7a of the back yoke 7. The four fastening portions 14 are arranged at equal intervals in the circumferential direction. The fastening portion 14 is a member, for example, for fastening and fixing the stator 3 to the case 4. A bolt insertion hole 10 that penetrates in an axis direction is formed on the fastening portion 14. By inserting a bolt 11 through the bolt insertion hole 10 and tightening the bolt 11 to the case 4 or the like, the stator 3 is fastened and fixed to the case 4.

A cooling path 12 that extends along the circumferential direction is formed on the back yoke 7. The cooling path 12 is formed inside the back yoke 7 and does not open to the outside. The cooling path 12 is divided into four portions in the circumferential direction. The circumferential length of each cooling path 12 is the same and is formed to be slightly shorter than a quarter of the circumferential length. Therefore, the cooling paths 12 are not in communication with each other. In FIG. 2, the cooling path 12 is shown by breaking part of the stator core 5 for ease of understanding.

Each cooling path 12 is arranged so as to correspond to the fastening portion 14. That is, each fastening portion 14 is located on the outside in the radial direction at the middle in the circumferential direction of each cooling path 12.

The width in the axis direction of the cooling path 12 is, for example, about ⅓ of the width in the axis direction of the back yoke 7.

However, the embodiment is not limited thereto, and the cooling path 12 may be formed so as not to open to the outside. The cooling path 12 is arranged at the middle in the axis direction of the back yoke 7.

A plurality of refrigerant discharge ports 15 are formed on the back yoke 7 at a position that overlaps the cooling path 12 when seen from the axis direction. The refrigerant discharge port 15 penetrates in the axis direction of the back yoke 7 via the cooling path 12. That is, the refrigerant discharge port 15 is in communication with the cooling path 12. The refrigerant discharge ports 15 are arranged side by side at equal intervals in the circumferential direction.

A refrigerant supply port 16 that causes the bolt insertion hole 10 and the cooling path 12 to be in communication with each other is formed on the back yoke 7. The refrigerant supply port 16 is formed on each divided cooling path 12. The refrigerant supply port 16 is formed along the radial direction. The refrigerant supply port 16 is arranged at the middle in the axis direction of the back yoke 7.

With reference back to FIG. 2, the cooling device 1 includes, in addition to the electric motor 2, a pump 17 that discharges a refrigerant, a heat exchanger 18 that cools the refrigerant discharged from the pump 17, a refrigerant supply pipe 19 and a refrigerant return pipe 23 that connect the pump 17 to the electric motor 2 via the heat exchanger 18, a control valve 20 (flow rate control device) provided in the middle of the refrigerant supply pipe 19, a temperature sensor 21 (temperature detection portion) provided on the stator 3, and a control portion 22 that performs drive control of the control valve 20.

The pump 17 pumps and discharges the refrigerant stored in a tank (not shown).

The refrigerant supply pipe 19 is branched into four lines so as to correspond to each cooling path 12 from the heat exchanger 18 and is connected to the bolt insertion hole 10. That is, the refrigerant supply pipe 19 connects the pump 17 to the refrigerant supply port 16 via the heat exchanger 18 and the bolt insertion hole 10.

The refrigerant return pipe 23 connects the tank (not shown) to the case 4.

The control valve 20 is provided on each branched refrigerant supply pipe 19. Each control valve 20 controls the flow rate of the refrigerant that flows through the corresponding refrigerant supply pipe 19.

The temperature sensor 21 detects the temperature of the stator 3 and outputs the detection result as a signal to the control portion 22. The temperature sensor 21 is provided, for example, on the coil 6 where the temperature becomes the highest in the stator 3.

The control portion 22 performs drive control of the control valve 20 on the basis of the detection result of the temperature sensor 21. Hereinafter, details of a specific operation of the cooling apparatus 1 are described.

<Operation of Cooling Apparatus>

In the description of the operation of the cooling apparatus 1, for ease of understanding, each name of each cooling path 12, each refrigerant supply pipe 19, and each control valve 20 may be distinctively referred to as follows in accordance with the arrangement attitude of the electric motor 2. That is, as shown in FIG. 2, in a state where the vehicle 100 is located on a horizontal road surface, the electric motor 2 has an attitude in which the four fastening portions 14 are located such that one is located on each of upper and lower sides (upper and lower sides of the paper surface), and one is located on each of front and rear sides. The attitude of the electric motor 2 shown in FIG. 2 shows a state in which the vehicle 100 is located on a horizontal road surface.

In such an attitude, in FIG. 2, an upward direction of the paper surface is referred to as a zero-o'clock direction, a right direction of the paper surface is referred to as a three-o'clock direction, a downward direction of the paper surface is referred to as a six-o'clock direction, and a left direction of the paper surface is referred to as a nine-o'clock direction. The cooling path 12 in the zero-o'clock direction is referred to as a zero-o'clock cooling path 12a. The cooling path 12 in the three-o'clock direction is referred to as a three-o'clock cooling path 12b. The cooling path 12 in the six-o'clock direction is referred to as a six-o'clock cooling path 12c. The cooling path 12 in the nine-o'clock direction is referred to as a nine-o'clock cooling path 12d.

The refrigerant supply pipe 19 connected to the zero-o'clock cooling path 12a via the bolt insertion hole 10 and the refrigerant supply port 16 is referred to as a zero-o'clock supply pipe 19a. The control valve 20 provided on the zero-o'clock supply pipe 19a is referred to as a zero-o'clock valve 20a (flow rate control device). The refrigerant supply pipe 19 connected to the three-o'clock cooling path 12b via the bolt insertion hole 10 and the refrigerant supply port 16 is referred to as a three-o'clock supply pipe 19b. The control valve 20 provided on the three-o'clock supply pipe 19b is referred to as a three-o'clock valve 20b (flow rate control device). The refrigerant supply pipe 19 connected to the six-o'clock cooling path 12c via the bolt insertion hole 10 and the refrigerant supply port 16 is referred to as a six-o'clock supply pipe 19c. The control valve 20 provided on the six-o'clock supply pipe 19c is referred to as a six-o'clock valve 20c (flow rate control device). The refrigerant supply pipe 19 connected to the nine-o'clock cooling path 12d via the bolt insertion hole 10 and the refrigerant supply port 16 is referred to as a nine-o'clock supply pipe 19d. The control valve 20 provided on the nine-o'clock supply pipe 19d is referred to as a nine-o'clock valve 20d (flow rate control device).

<Normal Operation of Cooling Apparatus>

First, a normal operation of the cooling apparatus 1 is described.

In the normal operation, the refrigerant pumped from the tank (not shown) by the pump 17 is supplied to each cooling path 12a, 12b, 12c, 12d via each supply pipe 19a, 19b, 19c, 19d, the bolt insertion hole 10, and the refrigerant supply port 16 (refer to an arrow Y1 in FIG. 3 and FIG. 4).

At this time, the bolt 11 is inserted through the bolt insertion hole 10. However, since a gap G is formed between the bolt insertion hole 10 and the bolt 11, the refrigerant flows into the refrigerant supply port 16 through the gap G.

Then, the refrigerant flows into all the entire cooling paths 12a, 12b, 12c, 12d (refer to an arrow Y2 in FIG. 3), and the entire circumference of the stator core 5 is cooled by the refrigerant. Then, the refrigerant that receives heat from the stator core 5 is discharged into the case 4 via the refrigerant discharge port 15.

The refrigerant discharged into the case 4 flows to return to the tank (not shown) via the refrigerant return pipe 23. Then, the refrigerant is pumped by the pump 17 again and is discharged to the refrigerant supply pipe 19. The refrigerant discharged from the pump 17 is cooled via the heat exchanger 18 and is supplied to each cooling path 12a, 12b, 12c, 12d again.

<Drive Control of Each Valve>

Next, the case of performing drive control of each valve 20a, 20b, 20c, 20d is described.

In the normal operation described above, an open degree of each valve 20a, 20b, 20c, 20d is approximately an intermediate open degree. When performing the drive control of each valve 20a, 20b, 20c, 20d, by controlling the open degree of each valve 20a, 20b, 20c, 20d, the flow rate of the refrigerant supplied to each cooling path 12a, 12b, 12c, 12d is controlled.

Before describing the drive control of each valve 20a, 20b, 20c, 20d, first, the position of the temperature sensor 21 is described. The temperature sensor 21 is arranged on each of the coil 6 located in the zero-o'clock direction and the coil 6 located in the six-o'clock direction. This is because the zero-o'clock direction and the six-o'clock direction in the stator core 5 tend to have the largest temperature difference. That is, the refrigerant discharged from the refrigerant discharge port 15 drips downward (in the six-o'clock direction). Since the refrigerant discharged from the refrigerant discharge port 15 receives heat from the stator core 5, the temperature is higher compared to an initial temperature when the refrigerant is supplied to each cooling path 12a, 12b, 12c, 12d.

In the stator core 5, in the six-o'clock direction in which a refrigerant having a relatively high temperature drips, the temperature tends to rise. On the other hand, in the zero-o'clock direction, the temperature is unlikely to rise. Therefore, the temperature sensor 21 is arranged on each of the coil 6 located in the zero-o'clock direction and the coil 6 located in the six-o'clock direction. In such a configuration, the cooling apparatus 1 operates as follows.

Figure 5:
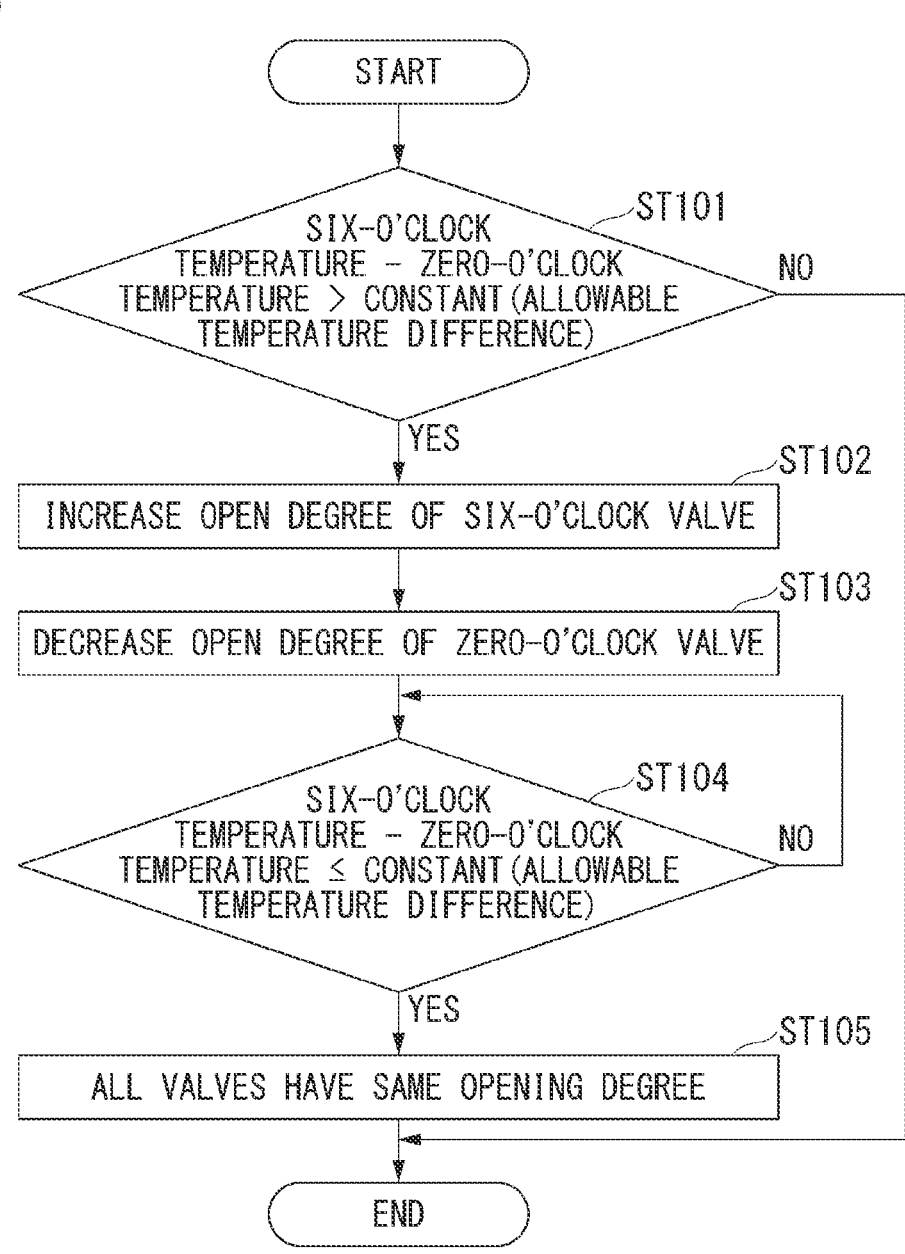
FIG. 5 is a flowchart when performing drive control of each valve in the embodiment of the present invention.

FIG. 5 is a flowchart when performing drive control of each valve 20a, 20b, 20c, 20d.

As shown in FIG. 2 and FIG. 5, in a state where the pump 17 is driven, first, a determination is made as to whether or not a difference between a temperature (hereinafter, referred to as a six-o'clock temperature) detected by the temperature sensor 21 in the six-o'clock direction and a temperature (hereinafter, referred to as a zero-o'clock temperature) detected by the temperature sensor 21 in the zero-o'clock direction is larger than a predetermined constant (Step ST101). The predetermined constant is a preset allowable temperature difference.

When the determination by Step ST101 is "No", that is, when the difference between the six-o'clock temperature and the zero-o'clock temperature is equal to or less than the predetermined constant, the process is completed without performing the drive control of each valve 20a, 20b, 20c, 20d. That is, the normal operation is maintained.

When the determination by Step ST101 is "Yes", that is, when the difference between the six-o'clock temperature and the zero-o'clock temperature is larger than the predetermined constant, the open degree of the six-o'clock valve 20c is increased (Step ST102). Then, the flow rate of the refrigerant in the six-o'clock supply pipe 19c and the six-o'clock cooling path 12c is increased, and the cooling in the six-o'clock direction of the stator core 5 is promoted.

Subsequently, the open degree of the zero-o'clock valve 20a is decreased (Step ST103). Then, the flow rate of the refrigerant in the zero-o'clock supply pipe 19a and the zero-o'clock cooling path 12a is reduced. Therefore, even if the flow rate of the refrigerant in the six-o'clock supply pipe 19c and the six-o'clock cooling path 12c is increased, it is possible to prevent a change of the total discharge amount of the refrigerant from the pump 17.

Subsequently, a determination is made as to whether or not the difference between the six-o'clock temperature and the zero-o'clock temperature is equal to or less than the predetermined constant (Step ST104).

When the determination by Step ST104 is "No", that is, when the difference between the six-o'clock temperature and the zero-o'clock temperature is larger than the predetermined constant, the determination by Step ST104 is continuously performed.

When the determination by Step ST104 is "Yes", that is, when the difference between the six-o'clock temperature and the zero-o'clock temperature is equal to or less than the predetermined constant, the valves 20a, 20b, 20c, 20d are caused to have the same opening degree (Step ST105). That is, the normal operation is performed. Then, the drive control of each valve 20a, 20b, 20c, 20d is completed.

In this way, in the embodiment described above, the cooling path 12 that extends along the circumferential direction is formed on the back yoke 7. The cooling path 12 is divided into four portions in the circumferential direction. The refrigerant supply port 16 is formed on each cooling path 12a, 12b, 12c, 12d. Therefore, it is possible to supply the refrigerant to each cooling path 12a, 12b, 12c, 12d separately. Therefore, it is possible to prevent cooling unevenness of the stator core 5 by the refrigerant, it is possible to uniformly cool the entire stator 3, and it is possible to contribute to continuous driving of the electric motor 2.

The stator core 5 has the fastening portion 14. The fastening portion 14 has the bolt insertion hole 10. The refrigerant supply port 16 is in communication with the bolt insertion hole 10. Therefore, by using the bolt insertion hole 10, the refrigerant can be supplied to each cooling path 12a,

12b, 12c, 12d via the refrigerant supply port 16. Accordingly, the processing cost of the refrigerant supply port 16 can be reduced.

Further, since the bolt insertion hole 10 is used, an impact on the back yoke 7 by forming the refrigerant supply port 16 can be minimized. That is, when the hole is unnecessarily increased in the back yoke 7, the magnetic circuit may be blocked, and a desired interlinkage magnetic flux may not be obtained as the entire stator 3. However, since the bolt insertion hole 10 is used, the hole formed in the back yoke 7 can be minimized. Therefore, the impact on the back yoke 7 by forming the refrigerant supply port 16 can be minimized.

The cooling apparatus 1 includes, in addition to the electric motor 2, the pump 17, the control valve 20 (valve 20a, 20b, 20c, 20d), the temperature sensor 21, and the control portion 22. The control portion 22 controls the control valve 20 on the basis of the temperature detected by the temperature sensor 21 and controls the flow rate of the refrigerant supplied to each refrigerant supply port 16. Therefore, the flow rate of the refrigerant of each cooling path 12a, 12b, 12c, 12d can be controlled in accordance with the temperature of the stator 3. Therefore, it is possible to further uniformly cool the entire stator 3, and it is possible to reliably contribute to continuous driving of the electric motor 2.

Modification Example

The above embodiment is described using the case in which the temperature sensor 21 is provided at two positions in the zero-o'clock direction and the six-o'clock direction of the stator 3. However, the embodiment is not limited thereto, and the number of temperature sensors 21 may be one, or may be three or more. When there is one temperature sensor 21, it is desirable to provide the temperature sensor 21 in the six-o'clock direction of the stator 3. In this case, for example, the change in the temperature difference from the zero-o'clock direction of the stator 3 in accordance with the temperature detected by the temperature sensor 21 may be stored in the control portion 22 as a graph or a table in advance. Then, in Step ST101 or Step ST104 described above (refer to also FIG. 5), the determination may be performed with reference to the graph or the table.

The above embodiment is described using the case in which the control valve 20 is controlled based on the temperature detected by the temperature sensor 21. However, the embodiment is not limited thereto, and the control valve 20 may be controlled by using a sensor capable of predicting the temperature of the stator 3. Examples of this type of sensor include a rotation speed detection sensor that detects the rotation speed of the electric motor 2 (rotor), a torque sensor 29 (refer to FIG. 2) that detects the torque of the electric motor 2, a temperature sensor that detects the temperature of a lubrication oil of the electric motor 2, and the like. A threshold value may be set in advance in accordance with the type of the sensor, and the control valve may be controlled in response to the determination as to whether or not a detection value exceeds the threshold value or the like. Hereinafter, a specific example is described, for example, when the torque sensor 29 of the electric motor 2 is used.

<Drive Control of Each Valve>

Figure 6:
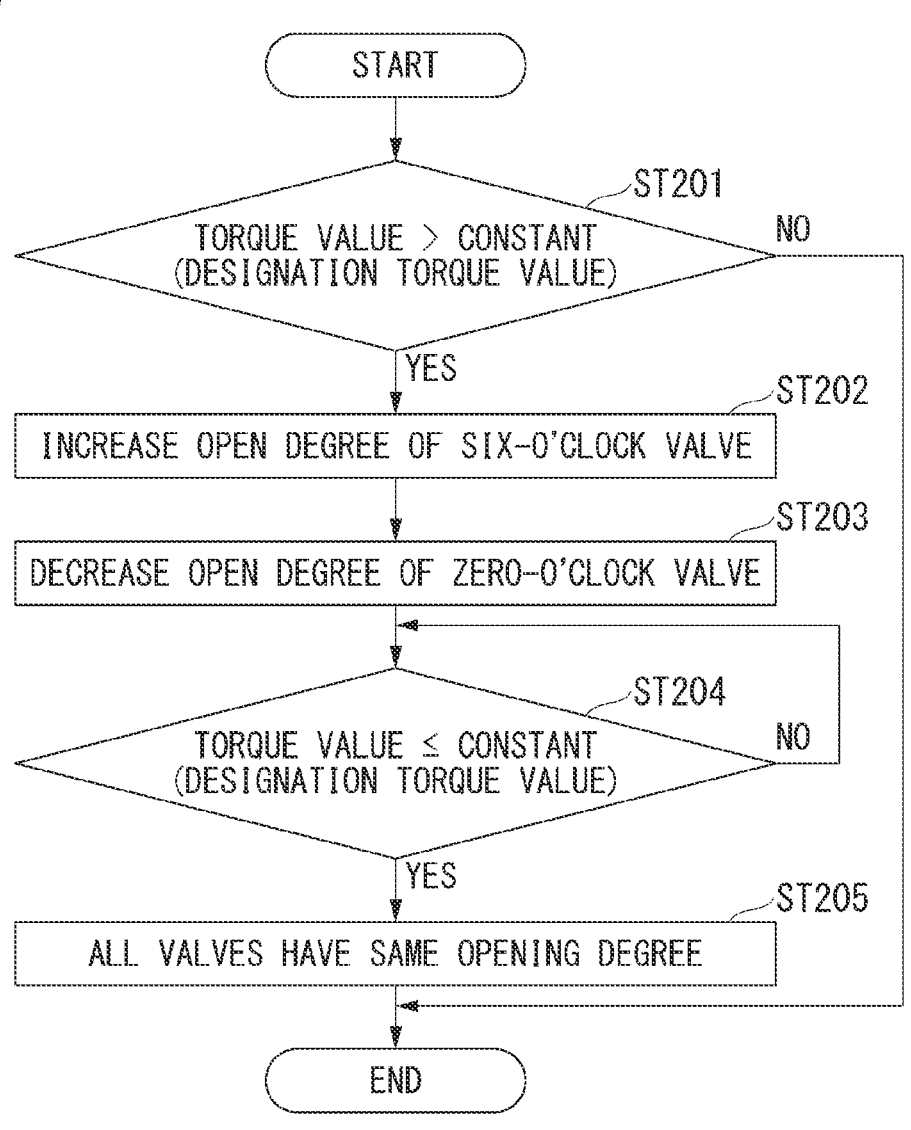
FIG. 6 is a flowchart when performing the drive control of each valve by using a torque sensor in the embodiment of the present invention.

FIG. 6 is a flowchart when performing the drive control of each valve 20a, 20b, 20c, 20d by using the torque sensor 29.

As shown in FIG. 6, in a state where the pump 17 is driven, first, a determination is made as to whether or not a torque value (hereinafter, simply referred to as a torque value) detected by the torque sensor 29 is larger than a predetermined constant (Step ST201). The predetermined constant is a designation torque value set in advance.

When the determination by Step ST201 is "No", that is, when the torque value is equal to or less than the predetermined constant, it is determined that the temperature increase of the stator 3 can be prevented. Therefore, the process is completed without performing the drive control of each valve 20a, 20b, 20c, 20d. That is, the normal operation is maintained.

When the determination by Step ST201 is "Yes", that is, when the torque value is larger than the predetermined constant, it is predicted that the temperature of the stator 3 is increased since a high load is applied on the electric motor 2. Therefore, the open degree of the six-o'clock valve 20c is increased (Step ST202). Then, the flow rate of the refrigerant in the six-o'clock supply pipe 19c and the six-o'clock cooling path 12c is increased, and the cooling in the six-o'clock direction of the stator core 5 is promoted.

Subsequently, the open degree of the zero-o'clock valve 20a is decreased (Step ST203). Then, the flow rate of the refrigerant in the zero-o'clock supply pipe 19a and the zero-o'clock cooling path 12a is reduced. Therefore, even if the flow rate of the refrigerant in the six-o'clock supply pipe 19c and the six-o'clock cooling path 12c is increased, it is possible to prevent a change of the total discharge amount of the refrigerant from the pump 17.

Subsequently, a determination is made as to whether or not the torque value is equal to or less than the predetermined constant (Step ST204).

When the determination by Step ST204 is "No", that is, when the torque value is larger than the predetermined constant, the determination by Step ST204 is continuously performed.

When the determination by Step ST204 is "Yes", that is, when the torque value is equal to or less than the predetermined constant, the valves 20a, 20b, 20c, 20d are caused to have the same opening degree (Step ST205). That is, the normal operation is performed. Then, the drive control of each valve 20a, 20b, 20c, 20d is completed.

According to such a configuration, effects similar to those of the embodiment described above are obtained.

The above embodiment is described using the case in which the control valve 20 is controlled by using the temperature sensor 21, another temperature sensor that detects the temperature of the lubrication oil of the electric motor 2, the rotation speed detection sensor and the torque sensor 29 that can predict the temperature of the stator 3, and the like. However, the embodiment is not limited thereto, and the control valve 20 may be controlled by using an inclination sensor 30 (refer to FIG. 7) that detects an inclination of the vehicle body 101 (electric motor 2).

As the inclination sensor 30, it is possible to use, for example, an inclination sensor that detects an inclination angle of an object as is, and an inertial sensor such as an acceleration sensor or a gyro-sensor that derives an inclination angle by using an acceleration. The inclination sensor 30 may be provided at any position as long as it is possible to detect the inclination of the electric motor 2 and the inclination of the vehicle body 101. Hereinafter, the drive control of each valve 20a, 20b, 20c, 20d by using the inclination sensor 30 is described.

Figure 7:
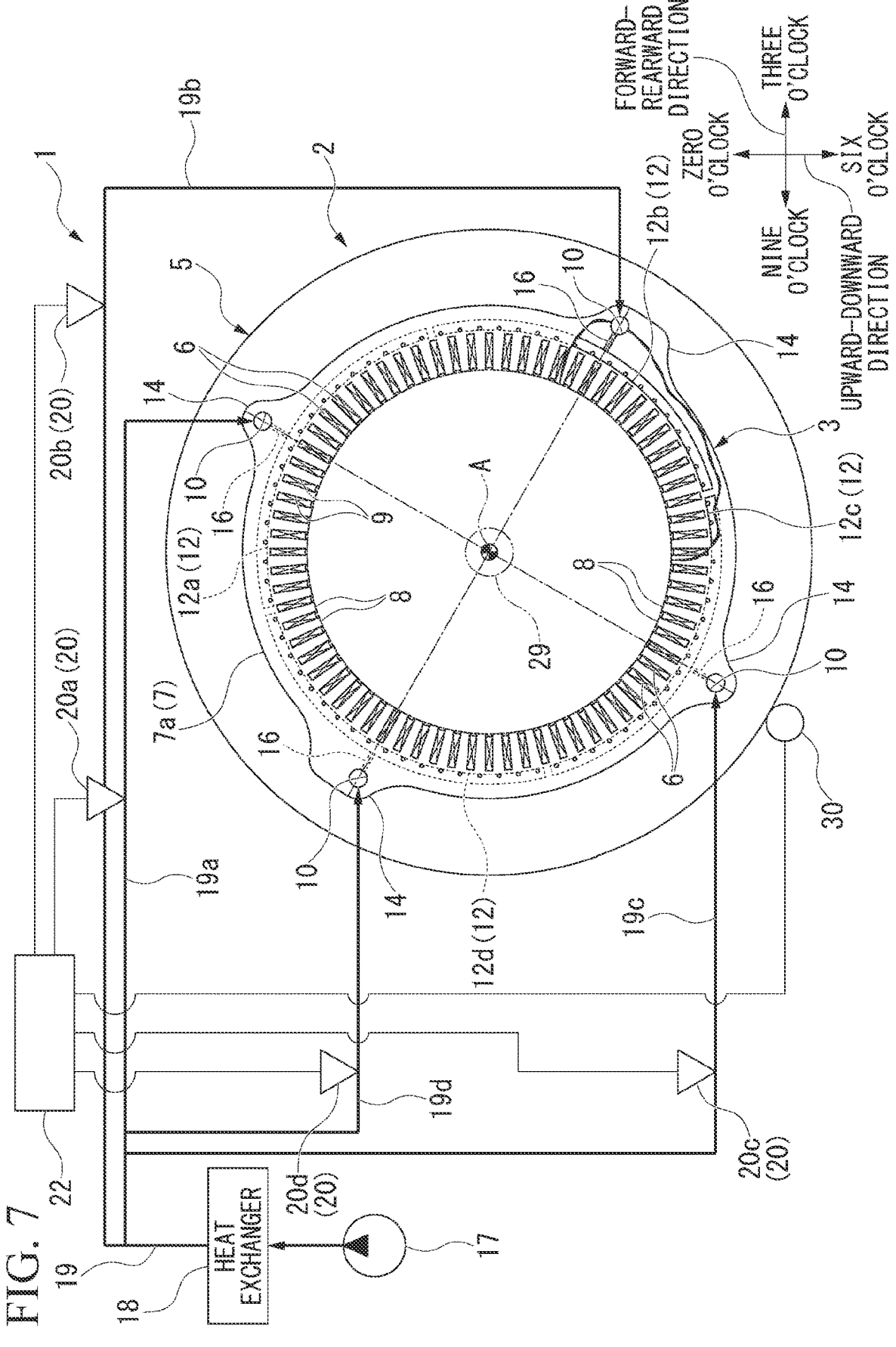
FIG. 7 is a schematic configuration view showing a modification example of the cooling apparatus in the embodiment of the present invention.

FIG. 7 is a schematic configuration view showing a modification example of the cooling apparatus 1.

FIG. 7 shows a state in which the vehicle 100 is traveling, for example, on a sloping road, and the zero-o'clock direction of the vehicle body 101 (electric motor 2) is inclined in the three-o'clock direction (clockwise direction on the paper surface). In such a case, as shown in FIG. 7, the zero-o'clock cooling path 12a and the nine-o'clock cooling path 12d are located at an upper position, and the three-o'clock cooling path 12b and the six-o'clock cooling path 12c are located at a lower position.

Here, as described above, the refrigerant supplied to each cooling path 12a, 12b, 12c, 12d receives heat from the stator core 5 and then drips downward via the refrigerant discharge port 15. Therefore, the temperature at portions of the stator core 5 that correspond to the three-o'clock cooling path 12b and the six-o'clock cooling path 12c that are located at a lower position is likely to increase. On the other hand, the flow rate of the refrigerant at portions of the stator core 5 that correspond to the zero-o'clock cooling path 12a and the nine-o'clock cooling path 12d that are located at an upper position tends to decrease. Therefore, it is desirable to ensure a certain amount of flow rate with respect to the flow rate of the refrigerant at the upper portion of the stator core 5 while increasing the flow rate of the refrigerant at the lower portion of the stator core 5. Under such a situation, the cooling apparatus 1 operates as follows.

<Drive Control of Each Valve>

Figure 8:
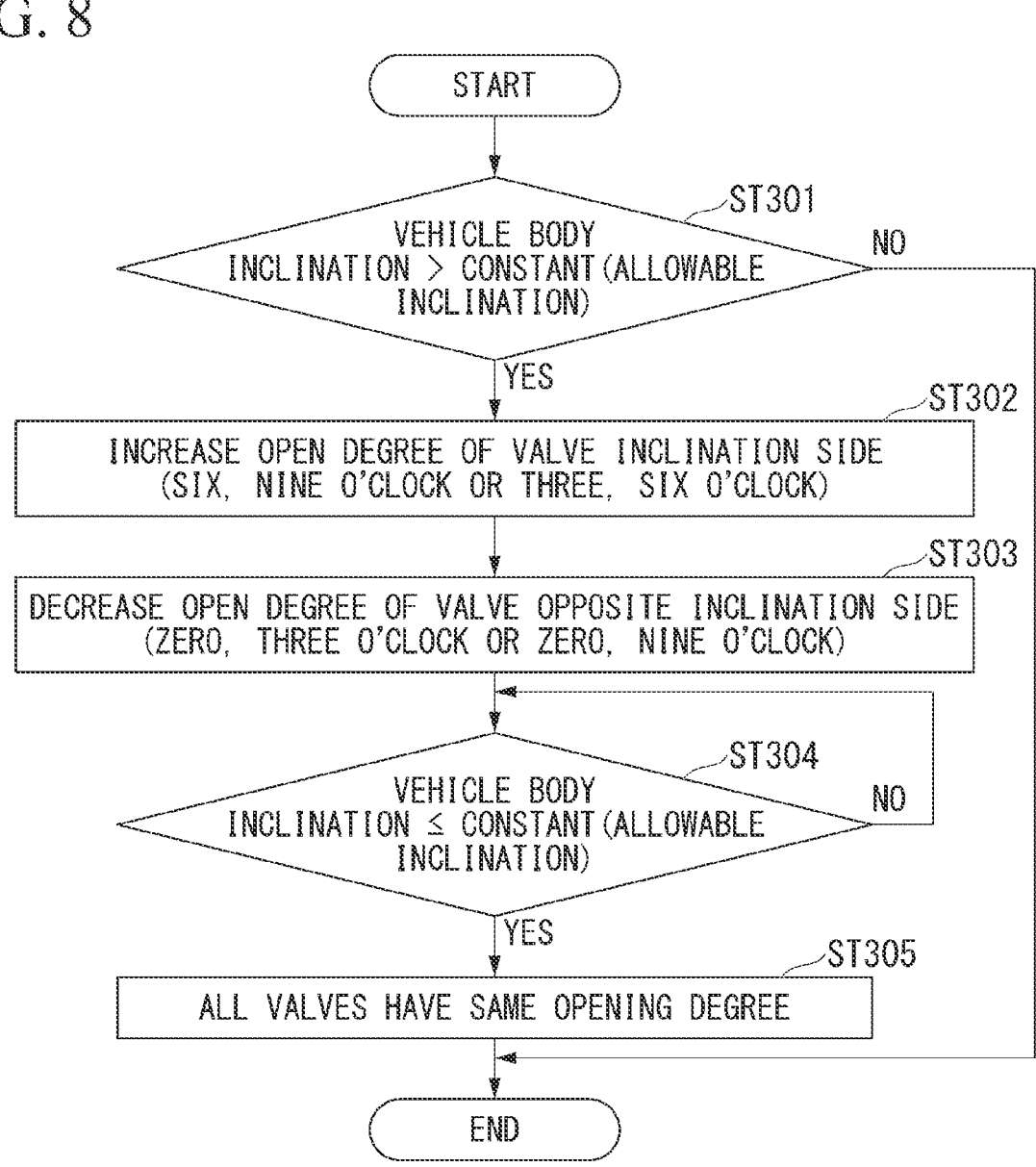
FIG. 8 is a flowchart when performing the drive control of each valve by using an inclination sensor in the embodiment of the present invention.

FIG. 8 is a flowchart when performing the drive control of each valve 20a, 20b, 20c, 20d by using the inclination sensor 30.

As shown in FIG. 8, in a state where the pump 17 is driven, a determination is made as to whether or not the inclination of the vehicle body 101 detected by the inclination sensor 30 is larger than a predetermined constant (Step ST301). The predetermined constant is an allowable inclination of the vehicle body 101 set in advance.

When the determination by Step ST301 is "No", that is, when the inclination of the vehicle body 101 is equal to or less than the predetermined constant, it is determined that the vehicle 100 is approximately in a state in which the vehicle 100 is located on a horizontal road surface.

That is, it is determined that each cooling path 12a, 12b, 12c, 12d is located substantially in a predetermined upper, lower, front, or rear direction. Therefore, the process is completed without performing the drive control of each valve 20a, 20b, 20c, 20d. That is, the normal operation is maintained.

When the determination by Step ST301 is "Yes", that is, when the inclination of the vehicle body 101 is larger than the predetermined constant, it is predicted that the vehicle 100 is traveling on an uphill road or a downhill road. Therefore, the open degree of valves 20a, 20b, 20c, 20d corresponding to two cooling paths on the side where the attitude is raised by the inclination among the cooling paths 12a, 12b, 12c, 12d is increased (Step ST302).

For example, in the attitude shown in FIG. 7, the open degree of the six-o'clock valve 20c and the nine-o'clock valve 20d is increased. For example, in an opposite direction (a state where the zero-o'clock direction of the vehicle body 101 is inclined in the nine-o'clock direction (counterclockwise direction on the paper surface)) of the attitude of FIG. 7, the open degree of the three-o'clock valve 20b and the six-o'clock valve 20c is increased. Then, a certain amount of flow rate is ensured with respect to the flow rate of the refrigerant at the upper portion of the stator core 5 while increasing the flow rate of the refrigerant at the lower portion of the stator core 5 and promoting the cooling at the lower portion of the stator core 5.

Subsequently, the open degree of valves 20*a*, 20*b*, 20*c*, 20*d* corresponding to two cooling paths on the side where the attitude is lowered by the inclination among the cooling paths 12*a*, 12*b*, 12*c*, 12*d* is decreased (Step ST303).

For example, in the attitude shown in FIG. 7, the open degree of the zero-o'clock valve 20*a* and the three-o'clock valve 20*b* is decreased. For example, in an opposite direction (a state where the zero-o'clock direction of the vehicle body 101 is inclined in the nine-o'clock direction (counterclockwise direction on the paper surface)) of the attitude of FIG. 7, the open degree of the zero-o'clock valve 20*a* and the nine-o'clock valve 20*d* is decreased. Thereby, since the flow rate of the refrigerant is reduced, it is possible to prevent a change in the total discharge amount of the refrigerant from the pump 17.

Subsequently, a determination is made as to whether or not the inclination of the vehicle body 101 is equal to or less than the predetermined constant (Step ST304).

When the determination by Step ST304 is "No", that is, when the inclination of the vehicle body 101 is larger than the predetermined constant, the determination by Step ST304 is continuously performed.

When the determination by Step ST304 is "Yes", that is, when the inclination of the vehicle body 101 is equal to or less than the predetermined constant, the valves 20*a*, 20*b*, 20*c*, 20*d* are caused to have the same opening degree (Step ST305). That is, the normal operation is performed. Then, the drive control of each valve 20*a*, 20*b*, 20*c*, 20*d* is completed.

According to such a configuration, effects similar to those of the embodiment described above are obtained. Additionally, a certain amount of flow rate is ensured with respect to the flow rate of the refrigerant at the upper portion of the stator core 5 while promoting the cooling at the lower portion of the stator core 5.

The above embodiment is described using the case in which each refrigerant supply port 16 is in communication with the bolt insertion hole 10. However, the embodiment is not limited thereto, and the refrigerant supply port 16 may be formed without being in communication with the bolt insertion hole 10. Hereinafter, a specific example is described.

Figure 9:
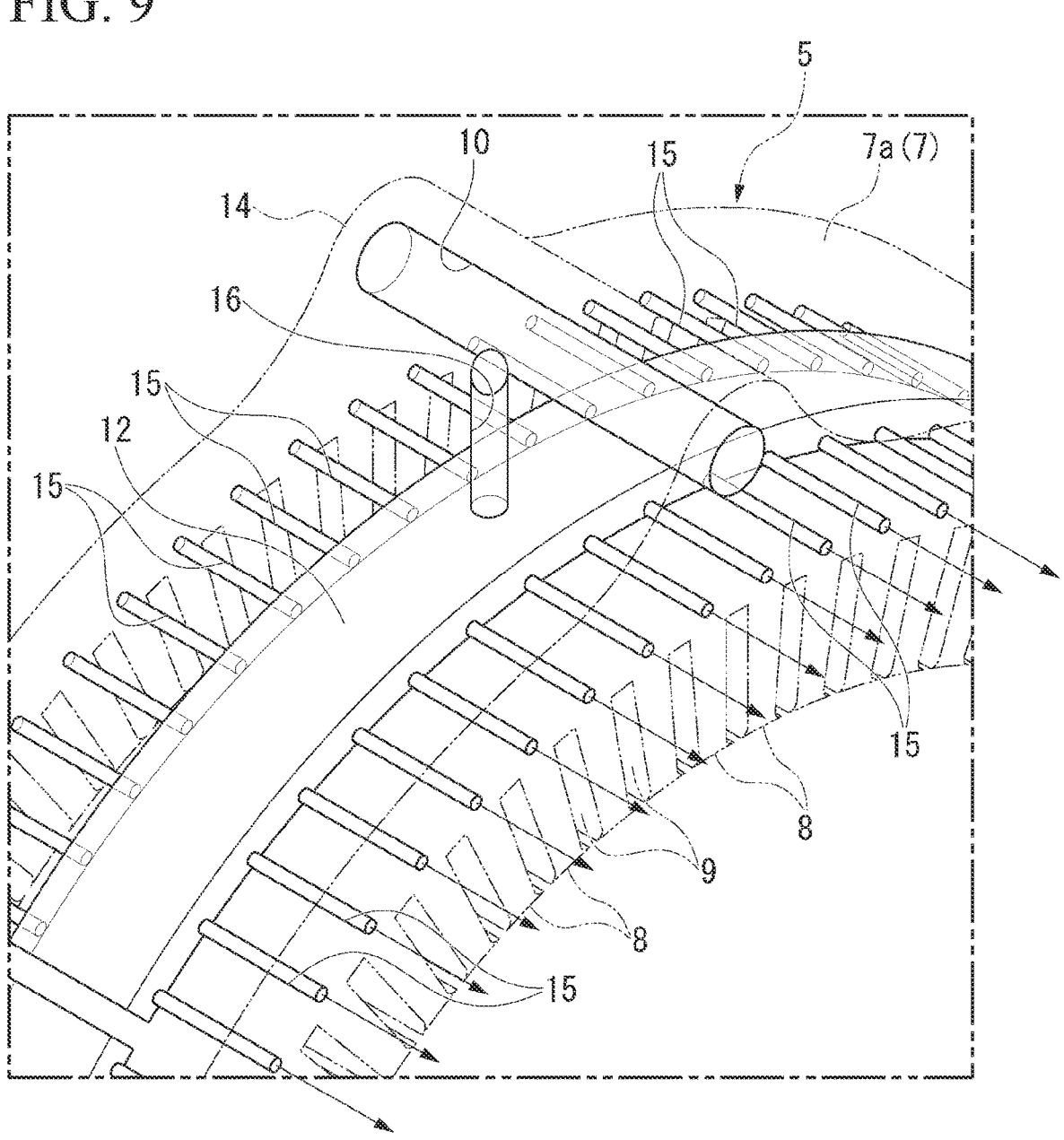
FIG. 9 is a perspective view showing a modification example of a refrigerant supply port in the embodiment of the present invention.

FIG. 9 is a perspective view showing a modification example of the refrigerant supply port 16. FIG. 9 corresponds to FIG. 3 described above. In FIG. 9, the outer surface of the stator core 5 is shown to be transparent for ease of explanation.

As shown in FIG. 9, each refrigerant supply port 16 is formed in the vicinity of the fastening portion 14.

The refrigerant supply port 16 extends inward in the radial direction from the vicinity of the fastening portion 14 in the outer circumferential surface 7*a* of the back yoke 7 and is in communication with the cooling path 12.

In such a configuration, the refrigerant supply pipe 19 (refer to FIG. 2 and FIG. 7) is connected directly to each refrigerant supply port 16. Therefore, effects similar to those of the embodiment described above are obtained.

The above embodiment is described using the case in which the cooling path 12 is divided into four portions in the circumferential direction. However, the embodiment is not limited thereto, and the cooling path 12 may be divided into at least two portions. The cooling path 12 may be divided into five or more portions.

The above embodiment is described using the case in which the cooling apparatus 1 is used for cooling the electric motor 2 mounted on the vehicle body 101. However, the embodiment is not limited thereto, and the cooling apparatus 1 can be used for cooling electric motors for various applications.

The above embodiment is described using the case in which the control valve 20 is used as a flow rate control device that controls a flow rate of a refrigerant. However, the embodiment is not limited thereto, and it is sufficient that the flow rate control device have a structure that can adjust the flow rate of the refrigerant. For example, a variable-capacity-type pump may be provided separately on each supply pipe 19*a*, 19*b*, 19*c*, 19*d*, and a portion that adjusts the discharge capacity of the pump may be the flow rate control device.

The above embodiment is described using the case in which the inclination sensor 30 is used as an inclination detection portion that detects the inclination of the vehicle body 101 (electric motor 2). However, the present invention is not limited thereto, and it is sufficient that the inclination detection portion can detect the inclination of the vehicle body 101 (electric motor 2). Any means can be employed as the inclination detection portion. For example, a configuration that predicts the inclination by calculation using an operation condition of the vehicle 100 may be the inclination detection portion. In this case, specifically, for example, the torque value of the electric motor 2 and an actual travel speed of the vehicle 100 are detected. When the actual travel speed is slower or faster than a prediction travel speed predicted from the torque value, it can be predicted that the vehicle body 101 is inclined. An inclination angle of the vehicle body 101 may be predicted using the difference between the prediction travel speed and the actual travel speed.

The present invention is not limited to the embodiments described above and includes those obtained by adding various changes to the embodiments described above without departing from the scope of the present invention.

What is claimed is:

1. An electric motor cooling apparatus which is a cooling apparatus of an electric motor having a stator,
   wherein the stator comprises:
   a stator core; and
   a coil wound around the stator core,
   the stator core comprises:
   a back yoke having a cylindrical shape;
   a plurality of tooth portions that protrude along a radial direction from the back yoke;
   a plurality of slots that are formed between the tooth portions adjacent in a circumferential direction;
   a cooling path which is provided on the back yoke along the circumferential direction so as not to be in communication with the slot and in which a refrigerant flows; and
   a refrigerant supply port that is formed on the back yoke and supplies the refrigerant to the cooling path,
   the electric motor cooling apparatus comprises:
   a pump that supplies the refrigerant to each refrigerant supply port;
   a flow rate control device that controls a flow rate of the refrigerant supplied to each refrigerant supply port from the pump;
   a temperature detection portion that separately detects temperatures of upper and lower portions of the stator; and a control portion that controls the flow rate control device based on the temperature detected by the temperature detection portion and controls the flow rate of the refrigerant supplied to the refrigerant supply port, the stator is arranged in an attitude in which a center axis line is along a horizontal direction, the cooling path is configured to be divided in the circumferential direction and is configured to be divided into two portions at least in an upward-downward direction, the refrigerant supply port is formed on each cooling path, the control portion sets refrigerant flow rates of upper and lower portions to be equal to each other when a temperature difference between the temperatures of the upper and lower portions of the stator detected by the temperature detection portion is smaller than a predetermined allowable temperature difference, and the control portion sets the refrigerant flow rate of the lower portion to be larger than the refrigerant flow rate of the upper portion when the temperature of the lower portion of the stator is higher than the temperature of the upper portion of the stator and the temperature difference between the temperatures of the upper and lower portions of the stator is larger than the predetermined allowable temperature difference.

2. The electric motor cooling apparatus according to claim 1, wherein the stator core has a fastening portion that fixes the stator core to a fixed body, the fastening portion has a bolt insertion hole through which a bolt for fixation to the fixed body is inserted, and the refrigerant supply port is in communication with the bolt insertion hole.

3. The electric motor cooling apparatus according to claim 1, wherein the stator is fixed to a vehicle body such that a center axis line is along a vehicle width direction, and the electric motor cooling apparatus comprises:

an inclination detection portion that detects an inclination of the vehicle body; and an inclination control portion that controls the flow rate control device based on the inclination detected by the inclination detection portion and controls the flow rate of the refrigerant supplied to the refrigerant supply port.

* * * * *